(12) United States Patent
Haeuptle

(10) Patent No.: US 7,581,167 B2
(45) Date of Patent: Aug. 25, 2009

(54) METHOD AND SYSTEM FOR AUTOMATED SIMULATION OF DYNAMIC URL-BASED WEB APPLICATION

(75) Inventor: Michael Haeuptle, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1465 days.

(21) Appl. No.: 09/858,634

(22) Filed: May 17, 2001

(65) Prior Publication Data

US 2004/0205490 A1 Oct. 14, 2004

(51) Int. Cl.
*G06F 17/00* (2006.01)
(52) U.S. Cl. .................... 715/206; 715/234
(58) Field of Classification Search ............. 715/513, 715/501.1, 505, 514, 206, 234, 239, 221
See application file for complete search history.

(56) References Cited

U.S. PATENT DOCUMENTS

| | | | | |
|---|---|---|---|---|
| 6,185,586 B1* | 2/2001 | Judson | ............... | 715/513 |
| 6,199,071 B1* | 3/2001 | Nielsen | ............... | 707/204 |
| 6,209,036 B1* | 3/2001 | Aldred et al. | ............... | 709/229 |
| 6,223,215 B1* | 4/2001 | Hunt et al. | ............... | 709/217 |
| 6,336,123 B2* | 1/2002 | Inoue et al. | ............... | 715/501.1 |
| 6,725,227 B1* | 4/2004 | Li | ............... | 707/102 |
| 7,017,120 B2* | 3/2006 | Shnier | ............... | 715/783 |
| 2002/0002491 A1* | 1/2002 | Whitfield | ............... | 705/14 |
| 2002/0052806 A1* | 5/2002 | Hodson et al. | ............... | 705/27 |
| 2002/0129014 A1* | 9/2002 | Kim et al. | ............... | 707/5 |
| 2002/0129034 A1* | 9/2002 | Woehl | ............... | 707/103 R |
| 2003/0191737 A1* | 10/2003 | Steele et al. | ............... | 707/1 |

OTHER PUBLICATIONS

Microsoft Computer Dictionary, Third Edition, Microsoft Press, 1997, pp. 487.*
Chen, Herng-Yow, et al, "An RTP-Based Synchronized Hypermedia Live Lecture System for Distance Education", Proceedings of the Seventh ACM International Conference on Multimedia (Part 1), Oct. 1999, pp. 91-99.*

* cited by examiner

*Primary Examiner*—Laurie Ries

(57) ABSTRACT

A method and system are described for simulating a dynamic link between electronic documents located in a computer network. In accordance with exemplary embodiments of the present invention, a first dynamic link is selected that leads from a first electronic document to a second electronic document. The position of the first dynamic link is located within a first set of instructions used to render the first electronic document. A navigation point associated with the first dynamic link is identified in the first set of instructions. The navigation point is then stored.

21 Claims, 4 Drawing Sheets

```
    <a onmouseover="imageOn('cnt_21')" onmouseout="imageOff('cnt_21')"
href="http://www.shopping.hp.com/cgi-bin/hpdirect/shopping/scripts/home/store_api.jsp?
BV_SessionID=@@@@1874524129.0980984891@@@@&BV_EngineID=gcalkclgfjdhbfdnckgcfjgdgmg.0&s
tore_name=homepc">
        <img class="contentarrow" name="cnt_21"
src="http://a44.g.akamai.net/f/44/1506/1d/www.shopping.hp.com/shopping/images/redesign
/stdnav/a_336699.gif" width="9" height="8" border="0"></a></td>
        <td class="">   <a onmouseover="imageOn('cnt_21')"
onmouseout="imageOff('cnt_21')" class="navArrowReg" style="text-decoration:none;"
href="http://www.shopping.hp.com/cgi-bin/hpdirect/shopping/scripts/home/store_api.jsp?
BV_SessionID=@@@@1874524129.0980984891@@@@&BV_EngineID=gcalkclgfjdhbfdnckgcfjgdgmg.0&s
tore_name=homepc">desktops</a></td>
    </tr>
</table>
</td>
        </tr>
```

210    205    200

```
<a onmouseover="imageOn('cnt_21')" onmouseout="imageOff('cnt_21')"
href="http://www.shopping.hp.com/cgi-bin/hpdirect/shopping/scripts/home/store_api.jsp?
BV_SessionID=@@@@1874524129.0980984910@@@&BV_EngineID=gcalkclgfjdhbfdnckgcfjgdgmg.0&s
tore_name=homepc">
    <img class="contentarrow" name="cnt_21"
src="http://a44.g.akamai.net/f/44/1506/1d/www.shopping.hp.com/shopping/images/redesign
/stdnav/a_336699.gif" width="9" height="8" border="0"></a></td>
    <td class="">    <a onmouseover="imageOn('cnt_21')"
onmouseout="imageOff('cnt_21')" class="navArrowReg" style="text-decoration:none;"
href="http://www.shopping.hp.com/cgi-bin/hpdirect/shopping/scripts/home/store_api.jsp?
BV_SessionID=@@@@1874524129.0980984910@@@&BV_EngineID=gcalkclgfjdhbfdnckgcfjgdgmg.0&s
tore_name=homepc">Desktops</a></td>
    </tr>
</table>
</td>
    </tr>
```

METHOD AND SYSTEM FOR AUTOMATED SIMULATION OF DYNAMIC URL-BASED WEB APPLICATION

BACKGROUND

1. Field of the Invention

The present invention relates to electronic documents located in a computer network. More particularly, the present invention relates to a method and system for simulating a dynamic link between electronic documents located in a computer network.

2. Background Information

The World Wide Web (hereinafter "Web") is a system of communications protocols that presents information in documents that are capable of being linked to other documents. The documents are stored in a distributed manner across a computer network, such as the Internet, and are accessed using programs known as browsers.

The Web is a system of protocols exchanged between a host computer running an application, known as a server, that delivers Web documents, and a user's computer, known as the client. Web documents are created using a markup language known as Hypertext Markup Language (HTML). Generally, a markup language is a set of instructions, or markups, that is used to direct a browser how to display and manage a document. Specifically, HTML defines the format of a Web document and enables hyperlinks to be embedded in the Web document. A hyperlink is an element in an electronic document that links to another place in the same document or to an entirely different document. The address of the document to which the hyperlink points is known as the Uniform Resource Locator (URL). The HyperText Transfer (HTTP) Protocol is used to carry out the download of a URL-referenced resource, such as a HTML document. The technical background of the Web is described in, for example, U.S. Pat. No. 5,764,916, the disclosure of which is hereby incorporated by reference.

URLs used in the hyperlinks can be either static or dynamic. For static URLs, the address to which the hyperlink points is always the same. For example, the URL www.shopping.hp.com/check-out.htm always remains the same, because this is a static URL. For dynamic URLs, a different, unique session identifier is encoded in the address every time the user accesses the site. A dynamic URL would look like the following: www.shopping.hp.com/23134/check-out.htm. The number in the URL is used as a session identifier for the particular user. The session identifier is unique for each user. However, it may change even for the same user depending on the expiration period of the session identifier.

A Web application, such as a shopping cart, can include multiple Web pages, each addressed by a URL. These Web pages are accessed in a specific order. For example, the user selects an item and puts it in the shopping cart, then proceeds to check-out. Shopping cart Web applications are, for example, generated by an application server. Thus, when a user accesses the main page, all URLs pointing to other pages are generated dynamically with the session identifier embedded in the URL. From this point on, all following Web pages will contain this number until, for example, the session expires. A session identifier is typically not re-used, and a new session identifier is generated every time the user visits the Web site.

Providers of Web applications have monitored these Web applications to verify availability and performance of the applications. Usually, providers want to use a predefined transaction to verify the operation, for example, the transaction of a customer using the shopping cart. This transaction can be recorded and then continuously replayed at a specific interval. Using this recorded transaction, availability and performance measurements can be forwarded to, for example, a management system that can present the data to the provider. However, to record and playback these predefined transactions, prior solutions use a subset of these transactions in which the URLs are static.

It would be desirable to provide a system and method which can record and playback transactions having multiple, dynamic URLs.

SUMMARY OF THE INVENTION

A method and system are described for simulating a dynamic link between electronic documents located in a computer network. In accordance with exemplary embodiments of the present invention, a first dynamic link is selected that leads from a first electronic document to a second electronic document. The position of the first dynamic link is located within a first set of instructions used to render the first electronic document. A navigation point associated with the first dynamic link is identified in the first set of instructions. The navigation point is then stored.

According to an exemplary embodiment, the stored navigation point associated with the first dynamic link is retrieved. The navigation point is located in a second set of instructions used to render a version of the first electronic document that has been updated to include a second dynamic link. The second dynamic link leads from the first electronic document to the second electronic document. The first and second dynamic links can be Uniform Resource Locators (URLs) that point to the same location, but have different session identifiers. The second dynamic link corresponding to the navigation point is extracted from the second set of instructions. The second dynamic link is used to navigate to the second electronic document.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 2 is an example of HyperText Markup Language (HTML) code showing a HTML anchor containing a dynamic Uniform Resource Locator (URL) and a navigation point in accordance with an exemplary embodiment of the present invention.

DETAILED DESCRIPTION OF THE PREFERRED EMBODIMENTS

Figure 1A:
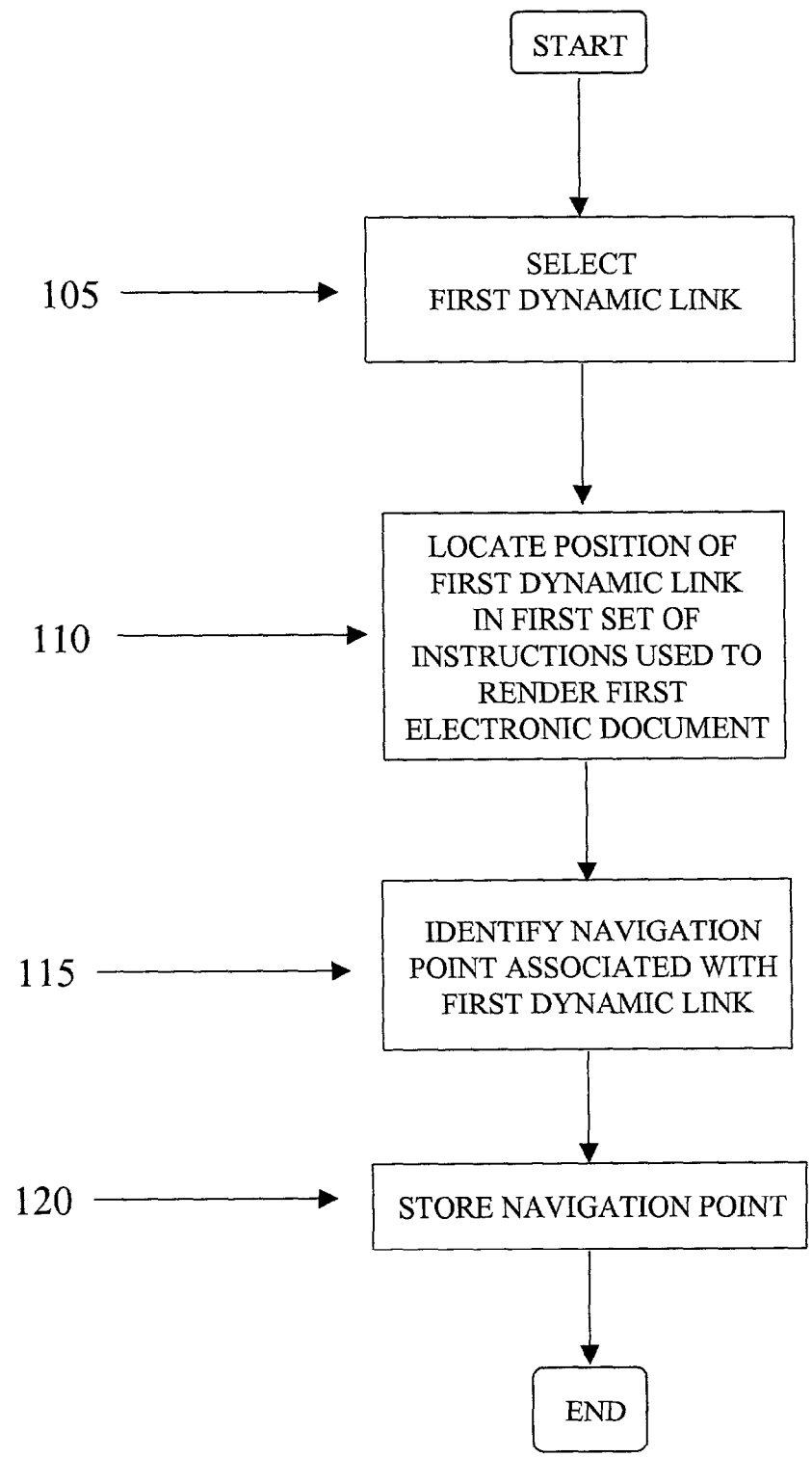
FIG. 1A is a flowchart showing steps for simulating a dynamic link between electronic documents located in a computer network to record a user's selection of the dynamic link in accordance with an exemplary embodiment of the present invention.
Figure 1B:
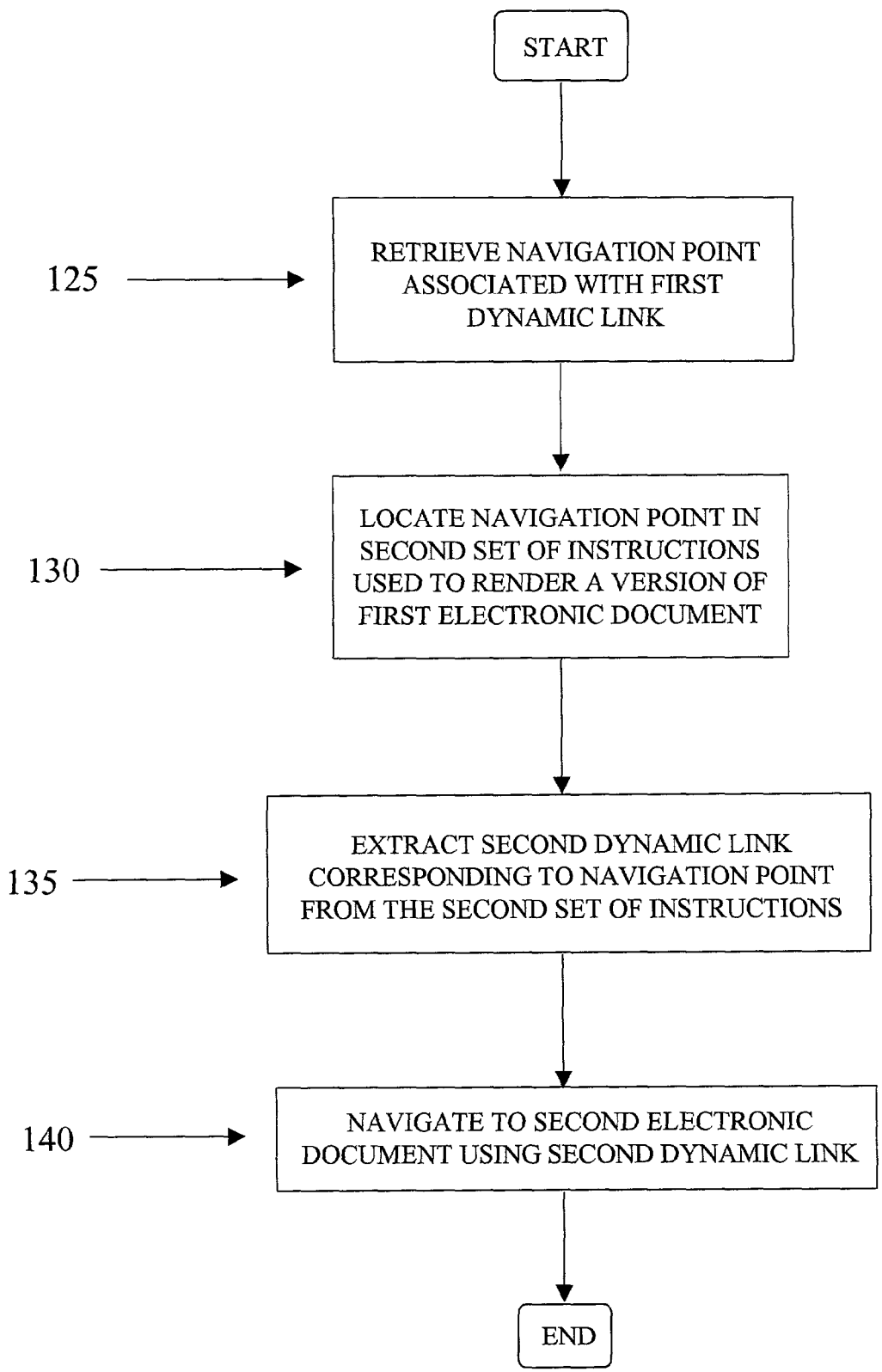
FIG. 1B is a flowchart showing steps for simulating a dynamic link between electronic documents located in a computer network to play back a user's selection of the dynamic link in accordance with an exemplary embodiment of the present invention.

FIGS. 1A and 1B are flowcharts illustrating the steps carried out for simulating a dynamic link between electronic documents located in a computer network to record and play back a user's selection of the dynamic link in accordance with an exemplary embodiment of the present invention. The steps for simulating a dynamic link between electronic documents located in a computer network to record a user's selection of the dynamic link will be described with reference to FIG. 1A. In step 105, exemplary embodiments of the present invention select a first dynamic link. The first dynamic link can lead from a first electronic document to a second electronic document. The first dynamic link can be selected from, for example, the rendered first electronic document. Selecting the first dynamic link refers to identifying the first dynamic link in a rendered electronic document in any manner, such as, for example, by typing the address of the first dynamic link or by clicking on the first dynamic link. The first dynamic link can be selected by, for example, an operator or by an automated computer program.

The first and second electronic documents can be located on the same computer or on different computers located remotely over a computer network, such as, for example, the Web. According to exemplary embodiments, the first and second electronic documents can be HyperText Markup Language (HTML) Web pages, or any other type of electronic documents that support hyperlinks or the linking of information within or between the electronic documents. In a Web page, for example, a user typically selects a hyperlink by clicking on it to follow the link to the next location. According to exemplary embodiments, the first dynamic link can be a Uniform Resource Locator (URL) that includes a unique session identifier.

By clicking on a hyperlink, a navigation event can be generated that can be sent to, for example, the Web server which serves the Web page. The navigation event can contain the first dynamic link, for example, the URL of the hyperlink that was selected by the user. For the first dynamic link, the URL can contain the unique session identifier. According to exemplary embodiments of the present invention, the first dynamic link contained in the event can be recorded or stored in computer memory or any other form of electronic storage media. However, any method can be used that captures or identifies the first dynamic link selected by a user. For example, the capturing of URLs, such as the first dynamic link, can be performed using any known web browser, such as, for example, Netscape Communicator™ or Microsoft Internet Explorer™, or using a dummy proxy stored on a local computer.

In step 110, a position of the first dynamic link can be located within a first set of instructions used to render the first electronic document. According to exemplary embodiments, the first set of instructions used to render the first electronic document (e.g., HTML source code) can be parsed or scanned to determine the location of the first dynamic link. To locate the first dynamic link, the first set of instructions can be searched for HTML anchors that contain the first dynamic link. Alternatively, the first set of instructions can be searched for HTML forms that contain the first dynamic link.

In HTML, a hyperlink can be created with an anchor. In HTML, an anchor starts with a symbol <A> and ends with a symbol </A>. Anchors are usually of the form:

<A HREF="URL">text</A> although any desired symbols and/or forms can be used for an anchor. In this representation, "HREF" is Hypertext Reference and "URL" is the address of the resource to which the link points. The "text" in the anchor is any descriptive text or other information that will be displayed in the Web page as the hyperlink. The user clicks on or selects the "text" in the Web page to follow the hyperlink.

With reference to FIG. 2, an example of HTML instructions or source code associated with a portion of a Web page that would be produced using the source code is shown. The FIG. 2 source code includes an anchor 200 containing a dynamic URL 205 that is specified by an "href" designation. In dynamic URL 205, the unique session identifiers are "1874524129.0980984891" and "gcalkclgfjdhbfdnck-gcfjgdgmg." In the FIG. 2 example, the "text" is the portion of the anchor designated "desktops," and of the FIG. 2 source code showing anchor 200, only the "text" of "desktops" would be displayed to the user. The "text" (e.g., "desktops") is typically used as a hyperlink that can be designated (e.g., clicked upon) by the user to navigate to a specific Web page.

Returning to step 115 of FIG. 1A, a navigation point associated with the first dynamic link can be identified in the first set of instructions. A navigation point can be any "text," or other specified information, that identifies the first dynamic link. According to exemplary embodiments, the navigation point can be any unique text that identifies a dynamic link. For example, the descriptive text (i.e., "text") that is displayed as the hyperlink in an anchor can be used as a navigation point. However, any unique text or identifier or any other desired information associated with a dynamic link, for example, any unique identifier within an anchor or linked to (e.g., indirectly addressed by) the anchor, that does not change dynamically, or that changes in a predictable and/or known manner, can be used as the navigation point.

Referring to FIG. 2, the text of "desktops" contained in the anchor can be used as a unique navigation point 210 associated with dynamic URL 205. On a Web page, the word "desktops" would be displayed to the user and, once selected, would take the user to the location specified by dynamic URL 205.

In step 120 of FIG. 1A, the navigation point (e.g., navigation point 210) can be stored. The navigation point can be stored in computer memory or any electronic storage media from which it can be later retrieved. Each time another electronic document is selected through a dynamic link, steps 105 through 120 can be repeated for each electronic document traversed to record the transactions.

The steps illustrated in FIG. 1A describe the process by which the selection of a dynamic link can be recorded. Once recorded, the transaction can be played back by using the navigation point to resolve the URL to the next electronic document. The steps for simulating a dynamic link between electronic documents located in a computer network to play back a user's selection of the dynamic link will be described with reference to FIG. 1B.

In step 125 of FIG. 1B, the navigation point associated with the first dynamic link can be retrieved. The navigation point can be retrieved from computer memory or from whatever form of electronic storage media that was used to store the navigation point.

Once retrieved, in step 130 the navigation point can be located in a second set of instructions used to render a version of the first electronic document that has been updated to include a second dynamic link. The second dynamic link can lead from the first electronic document to the second electronic document. The first electronic document and the updated version of the first electronic document are identical except for the unique, generated session identifiers contained in the dynamic links, or for any other difference specified by the user. According to exemplary embodiments, the second set of instructions can be parsed or scanned to determine the location of the navigation point. For example, the instructions or source code associated with a Web page (e.g., source code similar to that shown in FIG. 2) can be parsed or scanned to locate the anchor and to identify any "text" contained within the anchor for comparison with the retrieved navigation point to determine the existence of a match.

Once located, in step 135 the second dynamic link corresponding to the navigation point can be extracted from the second set of instructions. According to exemplary embodiments, the second dynamic link can be a URL that includes a unique session identifier. The second dynamic link can be a URL that points to the same location as the first dynamic link, but has a different session identifier than that of the first dynamic link. The second dynamic link can, like the first dynamic link, lead from the first electronic document to the second electronic document. In step 140, the second dynamic link can be used to navigate from the first electronic document to the second electronic document. For each electronic document traversed, steps 125 through 140 can be repeated to play back the recorded transactions. Since the actual recorded dynamic link is not used, the transaction can be continuously replayed by the use of the navigation points.

Figure 3:
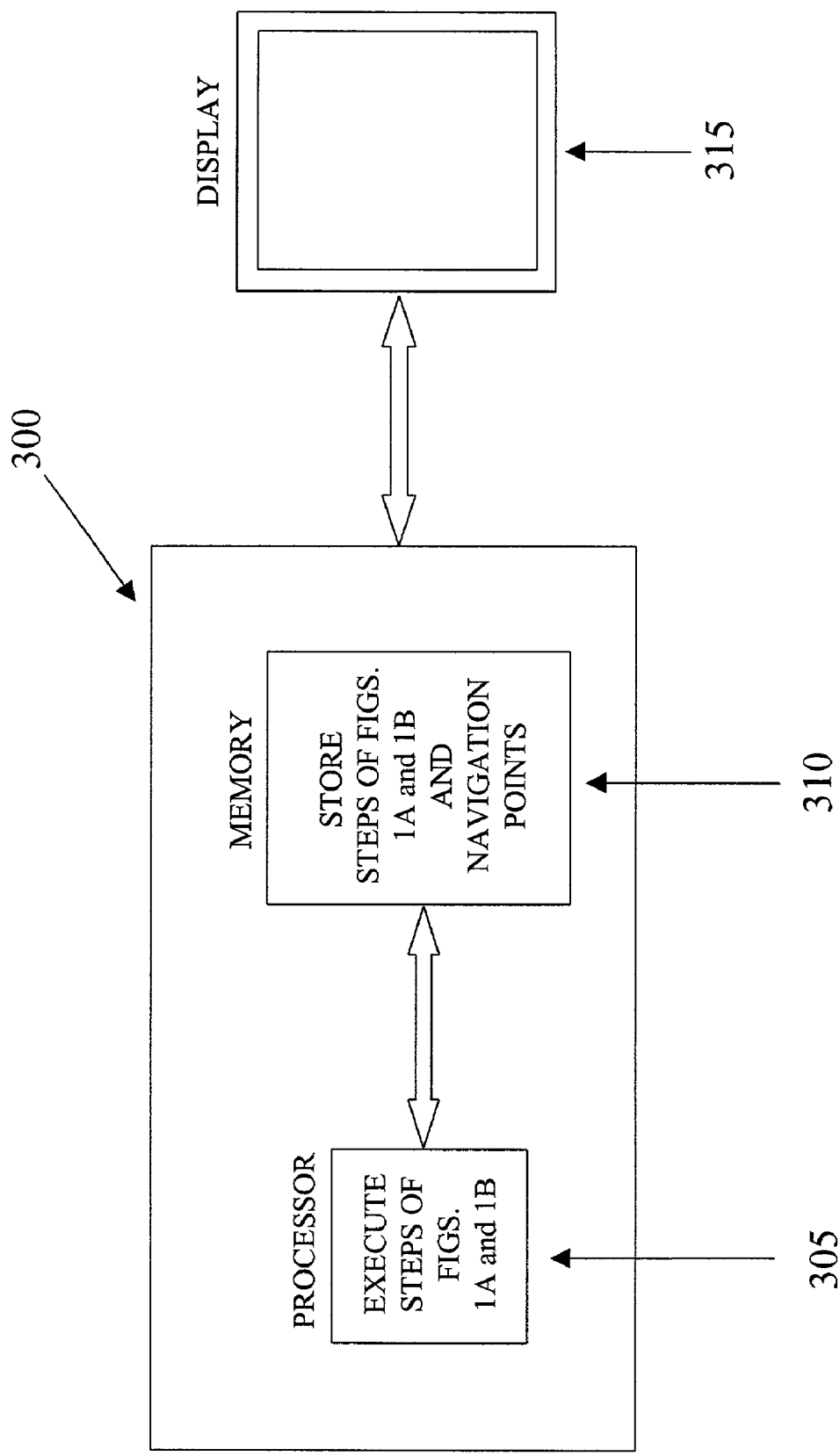
FIG. 3 is a block diagram of a system for simulating a dynamic link between electronic documents located in a computer network in accordance with an exemplary embodiment of the present invention.

A system for simulating a dynamic link between electronic documents located in a computer network in accordance with an exemplary embodiment of the present invention will be described with reference to FIG. 3. According to exemplary embodiments, the steps illustrated in FIGS. 1A and 1B can be performed using a computer 300, such as, for example, a personal computer or any other computer system. Computer 300 can include a memory 310. Memory 310 can be any computer memory or any other form of electronic storage media that is located either internally or externally to computer 300. Memory 310 can store, for example, the steps illustrated in FIGS. 1A and 1B and the navigation points.

Memory 310 can store steps to locate, within a first set of instructions used to render a first electronic document, a position of a first dynamic link that leads from the first electronic document to a second electronic document, and to store at least one navigation point that is associated with the first dynamic link. Memory 310 can also store steps to search for HTML anchors within the first set of instructions that contain the first dynamic link. Alternatively, memory 310 can store steps to search for HTML forms within the first set of instructions that contain the first dynamic link.

Memory 310 can also store steps to retrieve the navigation point associated with the first dynamic link, and to locate the navigation point in a second set of instructions used to render a version of the first electronic document that has been updated to include a second dynamic link. The second dynamic link can, like the first dynamic link, lead from the first electronic document to the second electronic document. Memory 310 can store steps to extract from the second set of instructions the second dynamic link that corresponds to the navigation point, and to navigate to the second electronic document using the second dynamic link.

Computer 300 can also include a processor 305 for accessing memory 310 to execute the steps of FIGS. 1A and 1B. Processor 310 can be any known processor, such as, for example, a microprocessor. The steps of FIGS. 1A and 1B can be executed by processor 305 using any known web browser, such as, for example, Netscape Communicator™ or Microsoft Internet Explorer™, that supports hyperlinks. The web browser can, for example, be modified to perform the steps of FIGS. 1A and 1B, or use a plug-in or any other form of software module that can be installed into the web browser to perform the steps. According to alternate embodiments, the steps of FIGS. 1A and 1B can be executed by processor 305 using a stand-alone software program that runs without a web browser. Alternatively, a stand-alone software program that runs externally to a web browser, but interfaces to the web browser to, for example, capture the dynamic links, can be used. However, the steps of FIGS. 1A and 1B can be executed by processor 305 in any manner either internally or externally to a web browser, and either with or without the use of a web browser.

A display 315 can be used in conjunction with computer 300 to display, for example, a web browser to a user. Display 315 can be a computer monitor or any other video display device for displaying graphical and/or textual information to a user. Through display 315, a computer keyboard (not shown), and any computer pointing device, such as, for example, a computer mouse (not shown), the user can interact with, for example, a web browser to navigate through Web pages via hyperlinks. According to exemplary embodiments, the first and second electronic documents, and the first and second dynamic links contained in the first electronic document, can be displayed to a user through the web browser displayed on display 315.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for simulating a dynamic link between electronic documents located in a computer network, comprising the steps of:
   selecting a first dynamic link that leads from a first electronic document to a second electronic document based on a Uniform Resource Locator (URL);
   locating, within a first set of instructions used to render the first electronic document, a position of the first dynamic link;
   identifying, in the first set of instructions, a text string in an anchor associated with the first dynamic link but not containing the first dynamic link;
   storing the text string in an anchor to record a transaction based on dynamic URLs; and
   retrieving the stored text string in an anchor to simulate the first dynamic link and play back the recorded transaction.

2. The method of claim 1, wherein the first and second electronic documents are Hyper Text Markup Language (HTML) web pages.

3. The method of claim 2, wherein the step of locating comprises:
   searching for HTML anchors within the first set of instructions that contain the first dynamic link.

4. The method of claim 2, wherein the step of locating comprises:

searching for HTML forms within the first set of instructions that contain the first dynamic link.

5. The method of claim 1, wherein the text string in an anchor is a unique text that identifies a dynamic link.

6. The method of claim 1, comprising the steps of:
retrieving the text string in an anchor associated with the first dynamic link;
locating the text string in an anchor in a second set of instructions used to render a version of the first electronic document that has been updated to include a second dynamic link, wherein the second dynamic link leads from the first electronic document to the second electronic document;
extracting, from the second set of instructions, the second dynamic link corresponding to the text string in an anchor; and
navigating to the second electronic document using the second dynamic link.

7. The method of claim 6, wherein each dynamic link is a Uniform Resource Locator (URL) that includes at least one unique session identifier.

8. The method of claim 7, wherein the first and second dynamic links are URLs that point to the same location and have different session identifiers.

9. The method of claim 1, comprising:
using the text string in an anchor to access the first dynamic link when navigating from the first electronic document to the second electronic document.

10. A system for simulating a dynamic link between electronic documents located in a computer network, comprising:
a memory that stores steps used to:
locate, within a first set of instructions used to render a first electronic document, a position of a first dynamic link that leads from the first electronic document to a second electronic document based on a Uniform Resource Locator (URL),
store at least one text string in an anchor that is associated with the first dynamic link but not containing the first dynamic link, and
retrieve the at least one text string in an anchor from storage to simulate the first dynamic link; and
a processor for accessing the memory and executing the steps to record at least one transaction based on a dynamic URL and replay the at least one recorded transaction.

11. The system of claim 10, wherein the text string in an anchor is used to access the first dynamic link when transferring from the first electronic document to the second electronic document.

12. The system of claim 10, wherein the first and second electronic documents are Hyper Text Markup Language (HTML) web pages.

13. The system of claim 12, wherein the memory stores steps to search for HTML anchors within the first set of instructions that contain the first dynamic link.

14. The system of claim 12, wherein the memory stores steps to search for HTML forms within the first set of instructions that contain the first dynamic link.

15. The system of claim 10, wherein the text string in an anchor is a unique text that identifies a dynamic link.

16. The system of claim 10, wherein the memory stores steps to retrieve the text string in an anchor associated with the first dynamic link, and to locate the text string in an anchor in a second set of instructions used to render a version of the first electronic document that has been updated to include a second dynamic link, wherein the second dynamic link leads from the first electronic document to the second electronic document.

17. The system of claim 16, wherein the memory stores steps to extract from the second set of instructions the second dynamic link that corresponds to the text string in an anchor, and to navigate to the second electronic document using the second dynamic link.

18. The system of claim 17, wherein each dynamic link is a Uniform Resource Locator (URL) that includes at least one unique session identifier.

19. The system of claim 18, wherein the first and second dynamic links are URLs that point to the same location and have different session identifiers.

20. The method of claim 1, wherein the dynamic link changes randomly.

21. The system of claim 11, wherein the dynamic link changes randomly.

* * * * *

UNITED STATES PATENT AND TRADEMARK OFFICE
CERTIFICATE OF CORRECTION

PATENT NO. : 7,581,167 B2　　　　　　　　　　　　　　　　　　　　　　　　Page 1 of 1
APPLICATION NO. : 09/858634
DATED : August 25, 2009
INVENTOR(S) : Michael Haeuptle It is certified that error appears in the above-identified patent and that said Letters Patent is hereby corrected as shown below:

On the title page, in item (54), Title, in column 1, line 3,
delete "APPLICATION" and insert -- APPLICATIONS --, therefor.

In column 1, line 3, delete "APPLICATION" and insert -- APPLICATIONS --, therefor.

In column 6, line 60, in Claim 2, delete "Hyper Text" and insert -- HyperText --, therefor.

In column 8, line 10, in Claim 12, delete "Hyper Text" and insert -- HyperText --, therefor.

In column 8, line 41, in Claim 21, delete "claim 11," and insert -- claim 10, --, therefor.

Signed and Sealed this

Twenty-seventh Day of July, 2010

David J. Kappos
*Director of the United States Patent and Trademark Office*